Feb. 25, 1930. E. G. JOHNSON 1,748,511
CHUCK
Filed June 13, 1928 2 Sheets-Sheet 1
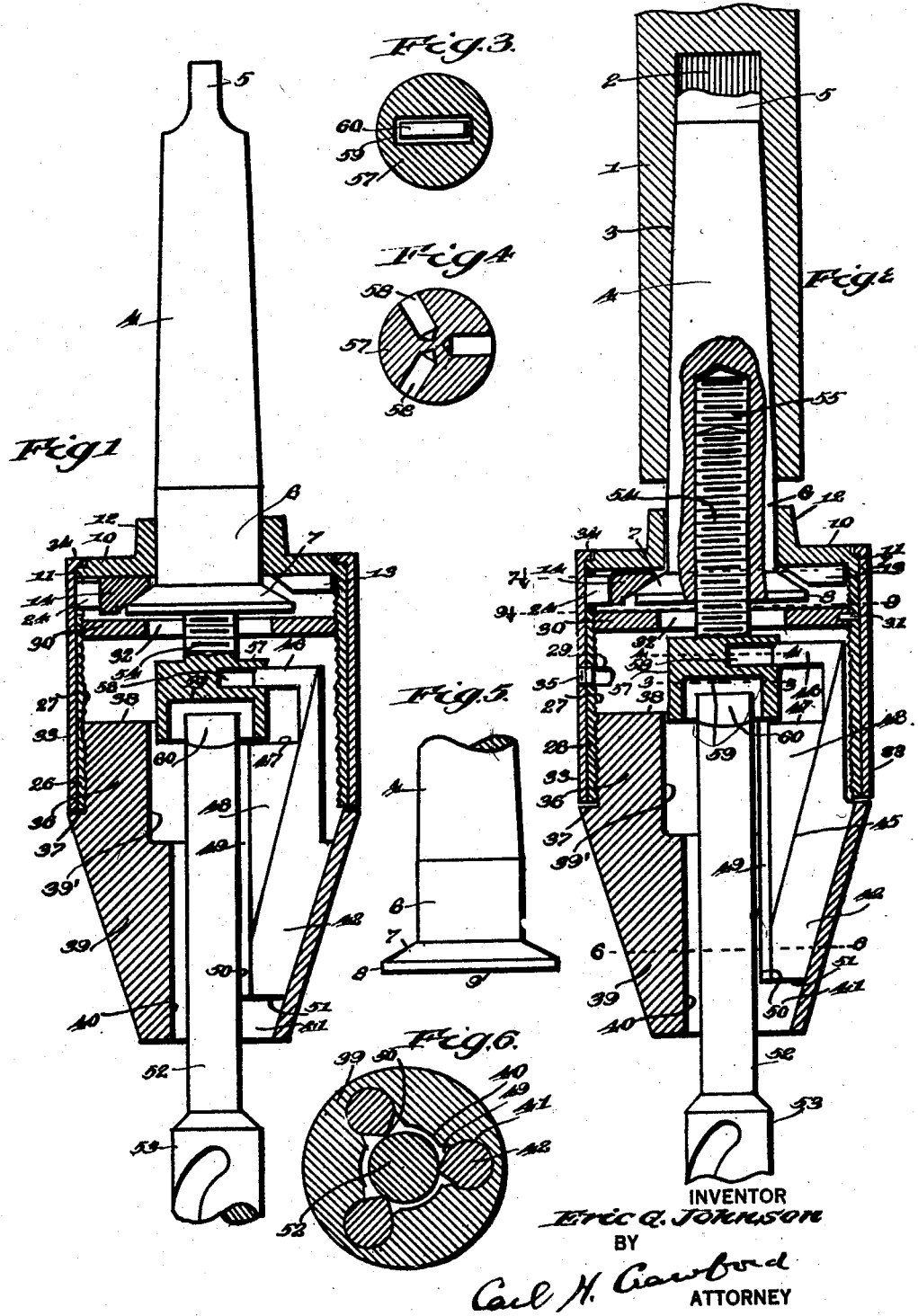
INVENTOR
Eric G. Johnson
BY
Carl H. Crawford
ATTORNEY

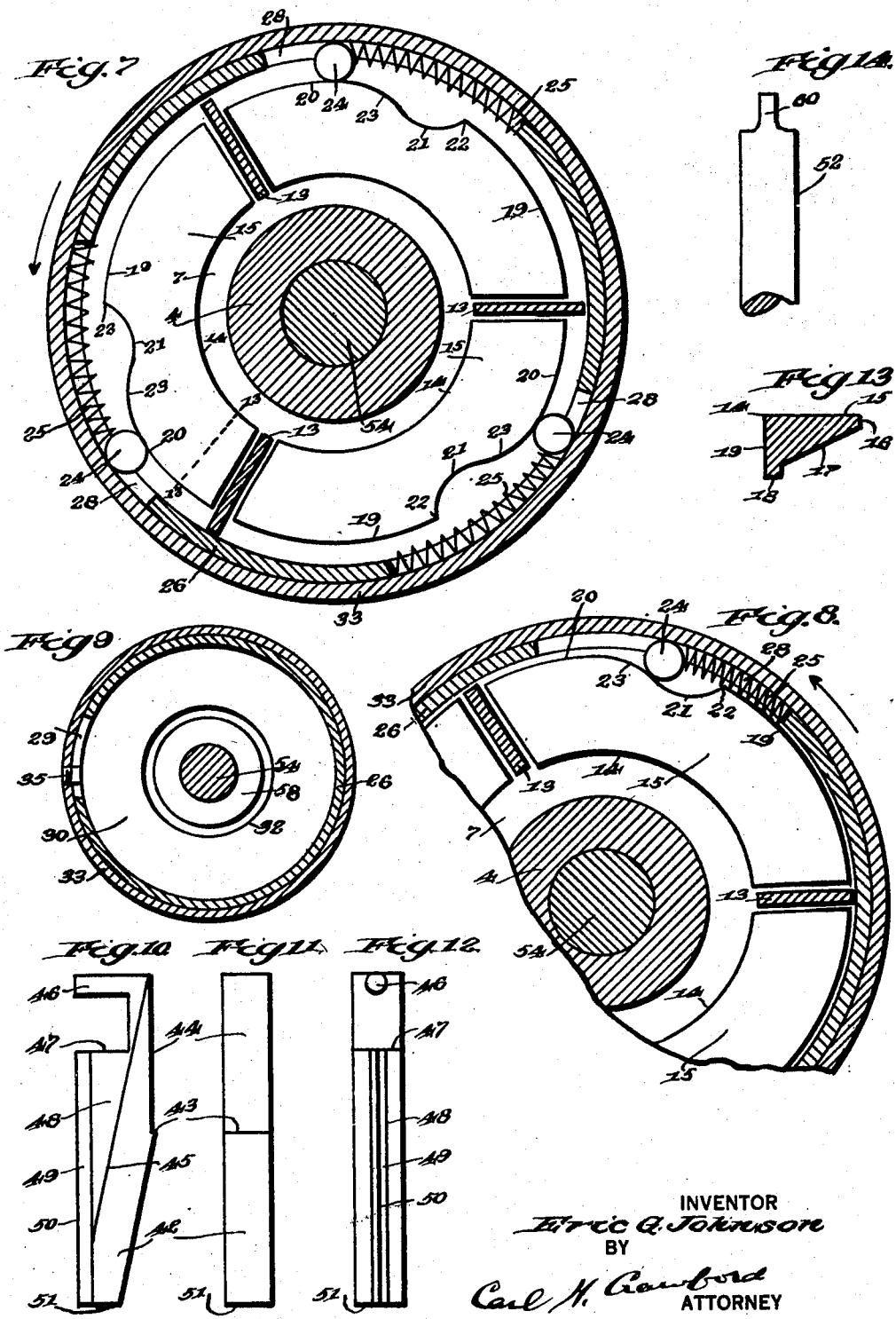

Patented Feb. 25, 1930

1,748,511

UNITED STATES PATENT OFFICE

ERIC G. JOHNSON, OF HARRISON, IDAHO

CHUCK

Application filed June 13, 1928. Serial No. 285,048.

This invention relates to improvements in drill chucks.

An important object of this invention is to provide a chuck which will securely and positively hold a drill that is provided with a straight or cylindrical shank, and it is an especially important feature to rigidly hold such shank structurally and positively against slippage.

A further object is to provide a chuck that may be quickly and easily released by manual action to free the gripped tool irrespective of the extent of gripping action applied thereto.

The improved chuck involves left hand threaded parts which function as a result of right hand turning thrust to tighten the chuck on the drill shank.

It is also a feature of my invention to provide means of one character acting longitudinally of the axis of the chuck for motivating the tool gripping action, and a means of another character acting transverse or annularly of the chuck for maintaining, and also releasing gripping action.

The invention has many other objects and features which will be more fully described in connection with the accompanying drawings and which will be more particularly pointed out in and by the appended claims.

In the drawings:

Fig. 1, is a sectional view of my improved chuck showing the same in a drill or tool gripping position.

Fig. 2, is a similar view before a gripping adjustment has been applied to the drill.

Fig. 3, is a sectional view on line 3—3 of Fig. 2.

Fig. 4, is a sectional view on line 4—4 of Fig. 2.

Fig. 5, is a fragmentary view of the chuck shank showing the improved chuck head thereon.

Fig. 6, is a sectional view on line 6—6 of Fig. 2.

Fig. 7, is an enlarged sectional view on line 7—7 of Fig. 2, showing the frictional clutch in a clutching position.

Fig. 8, is a fragmentary sectional view similar to Fig. 7, showing the same parts in a released position.

Fig. 9, is a sectional view on line 9—9 of Fig. 2.

Fig. 10, is a view in side elevation of one of the gripping jaws or dogs for gripping the drill shank.

Fig. 11, is a view of the same looking from the right of Fig. 10.

Fig. 12, is a view of the same looking from the left of Fig. 10.

Fig. 13, is a sectional view on line 13—13 of Fig. 7.

Fig. 14, is a fragmentary view of my improved tool shank.

Like characters of reference designate similar parts throughout the different figures of the drawings.

I will first describe the specific structure and will thereafter describe the operation thereof.

A drill chuck sleeve is shown at 1, and the same is equipped with the usual end socket 2, which terminates the conical or tapered bore 3, of the chuck. This is the portion that is mounted on the drill mechanism and to which rotary right hand power thrust is applied to operate the chuck of my invention, which I am now about to describe.

A part of my improved chuck includes a chuck shank 4 which is suitably tapered to fit bore 3, and which is provided on its upper end with a flat key projection 5. adapted to enter socket 2, and non-rotatively connect the chuck shank 4, with the chuck sleeve 1, as will be clearly seen by reference to Figs. 1 and 2. Below the chuck sleeve 1, said chuck shank 4, has a cylindrical portion 6. The lower portion is in the form of a tapered clutch head or section 7, which flares outwardly beyond the diameter of section 6, and terminates in a cylindrical section 8, having a flat bottom 9.

A clutch head plate is shown at 10, and the latter is equipped with an annular shoulder 11, on the periphery thereof. Said plate 10, is provided with a hub 12 having a cylindrical bore adapted to snugly fit the cylindrical section 6, with a sufficient clearance to permit of manually and relatively turning the two parts with respect to each other. Cam segment separating members 13, may, if desired, be mounted in fixed relation to plate 10, and, as will be seen from Figs. 7 and 8, said spacing or separating members are radially disposed and are three in number. However, I do not wish to be limited to this specific number of said members.

Clutch segments 14, three in number, are disposed annularly about the clutch head and have flat top clutch faces 15, adapted for engagement with the inside or lower face of clutch plate 10. Said segments also have cylindrical faces 16, and tapered clutch faces 17, the latter being adapted for engagement with tapered face 7. The lower faces are indicated at 18, and function, in some capacities, as supporting faces and are adapted to coact with a retaining member to be presently described. Said segments have peripheral cam faces, the radial high points of which are indicated at 19 and 20. A cam or low portion is designated at 21 and extends radially inwardly from point 22, and thence extends gently outwardly at 23, toward and gradually merges into high point 20. A clutch roller 24, is interposed between each segment and a part that will be presently described. I prefer to urge the rollers 24, contra-clockwise, looking at Fig. 7, by means of springs 25, as shown, although this is not absolutely essential.

A body or connecting sleeve is indicated at 26, and I prefer to make this sleeve integral or in fixed relation to plate 10, as shown, hence, the structure forms an inverted cup which will broadly be termed a connecting member. The sleeve portion of said member is provided on its interior with right hand screw threads 27. Abreast of the peripheries of said segments 14, said sleeve is provided with slots 28, as clearly shown. It will be noted that the shoulder 11, is disposed at the annular juncture of the sleeve 26 with plate 10. Said sleeve is provided with a connecting and releasing slot 29, extending circumferentially thereof as shown.

A parts retaining member, preferably in the form of a ring 30, is peripherally threaded to be turned into the position shown, in sleeve 26, and suitably secured therein as by means of a pin 31. Said retaining ring 30, is provided with a central opening 32, and is located in normally slightly spaced relation to the parts thereabove.

Rotatable outside said body or connecting sleeve 26, is a clutch-releasing sleeve 33 which is provided with an inwardly extending shoulder 34 adapted to coact with shoulder 11. Said sleeves 26 and 33 have lost motion connection which is embodied in the slot 29, and a pin 35, the latter being threaded into an opening in sleeve 33, and having a smooth end extending into slot 29. This lost motion connection prevents the sleeve 33 from moving upwardly on sleeve 26 and when pin 35 is removed the sleeve 33 can readily be telescoped off from sleeve 26, upwardly therealong. It will also now be clear that sleeve 33 may be slightly oscillated about sleeve 26.

A chuck body 36 is threaded into sleeve 26 and said body has a shoulder 37, adapted for engagement with the lower edges of said sleeves 26 and 33 and limits the tightening engagement of said body 36 with sleeve 26. Said body 36 terminates at its upper end at 38 and is provided with an enlarged bore 39' extending downwardly for a portion of the length thereof as shown. The chuck body 36, is preferably provided with a conical head 39 and a drill shank bore 40 extends upwardly through said head 39 and into alined relation with bore 39'. Said chuck head 39 is provided with a plurality of obliquely disposed jaw or dog bores 41, three in number, which intersect said bore 40, as clearly shown. It will be seen by reference to Fig. 2, that these bores 41, which take the shape of the dogs that will be presently described, extend upwardly through the top end 38, of the chuck body.

Reference will next be made to the dogs or jaws that are slidably and adjustably mounted in the oblique bores.

As shown in Fig. 10, in side elevation, the jaw has a rear oblique semi-cylindrical section 42 terminating at 43 in a slight shoulder for limiting outward movement of the dog. From shoulder 43, upwardly, the rear portion 44 is substantially flat or merely arched transversely sufficiently to fit the sleeve 26. The lines 45, outline the extent to which the semi-cylindrical portion approaches the front of the dog. The dog is provided with a radially inwardly extending actuating finger 46 and is cut away to form an abutment top 47, the purpose of which will presently appear. The forward or front portion 48 has a transversely converging front edge 49 which tapers to a linear drill shank gripping apex edge 50 which extends from the bottom 51 to the abutment 47, and is adapted to engage the shank 52 of a drill 53, as shown. Thus, it will be seen that the oblique bores 41 and the dogs slidable therein, are so arranged that the gripping apex edges 50 move in parallel relation with the shank that they grip, the drill shank being cylindrical.

Reference will next be made to the novel means for causing movement of said dogs into and out of gripping relation with the drill shank or the shank of any tool that may be employed.

A jaw or dog actuating strut screw 54 has left hand threaded connection with a complementally threaded bore 55, in shank 4. Said screw 54 has an actuating head 57, which is adapted to move through the opening 32, in retaining member 30, and is provided with three radially disposed sockets 58 into which the fingers 46 are adapted to slidably project inwardly and outwardly although said fingers are never wholly disengaged from said sockets. In the lower portion of said head is a slot socket 59, and the drills used in connection with this chuck, are provided each with a lug 60, adapted to be projected into said socket so that the drill shank 52 will be non-rotatively connected with said actuating head 57. I consider that a tool, such as a drill, having a cylindrical shank and a lug projecting endwise from the shank, as a new and novel article of manufacture, and have claimed it as such.

I will next describe the operation of my improved chuck.

Assuming that the shank 4 is fast in the sleeve 3, and with the parts in the Fig. 2 position, the user would first insert the drill shank 52 so that the lug 60 would be projected into socket 59 and would hold the drill in such position. Then, before actuating the dogs, the user would first turn sleeve 33 in a contra-clockwise direction, viewing Figs. 7 or 9, to get the rollers 24 onto the high points 20, of the segments 15. If the user did not make this preliminary adjustment, he might not be able to get the rollers 24 into such position. Then, the user would, by grasping the sleeve 33, turn the whole chuck body in a contra-clockwise direction, viewing Fig. 9, to cause the left handed threaded connection 54 to advance head 57 downwardly and thereby force the dogs against the drill shank.

After the head 57 had been advanced downwardly to such position, and could not be further advanced, then, there would be an upward thrust imparted to screw 54, endwise thereof, forcing the flared portion 7 upwardly against the inclined portions 17 of the segments, and resultantly forcing the top faces 15 of the latter against the under face of plate 10. Of course, plate 10, could not rise, under such thrust, as it is an integral part of sleeve 26. Then further power thrust, in operating the drill, would tend to still further tighten the parts. However, afterwards, when desiring to release the drill, a slight adjustment of sleeve 33, in a clockwise direction, viewing Fig. 9, would return the rollers to the lower points of the segments, and enough play would thus be afforded so that the chuck body could be turned clockwise with respect to shank 4, and thereby elevate the dogs out of engagement from the drill shank.

The head 57, in its downward movement, is turned by the fingers 46 of the dogs, which latter are also turned as a result of rotary adjustment of the chuck. However, the head 57 and the dog and chuck body, turn on shank 4, as a unit. As the head 57 descends in bore 39', the dogs are moved toward and into engagement with the drill shank 52, as shown in Fig. 1. Thus, when the drill shank 52 is gripped, the lug 60 is held in socket 59 so that the drill shank 52, in addition to being gripped by the dogs, is non-rotatively connected with head 57 throughout the working of the drill. After the dogs have gripped the shank 52, the head 57 cannot descend further except to slightly tighten the gripping action of the dogs with the drill shank, which, under stress of drilling action, might be an almost imperceptible movement of head 57. It will thus be seen that in the absence of any further means, the drill shank 52 would be locked to the body 39 and as the head 57 could not further descend into a dog tightening movement as a result of clockwise turning thrust on shank 4, the threaded connection of screw 54, with shank 4, would, and possibly could, take the drilling stress.

In any event, screw 54 and shank 4, would actually take a portion of the drilling stress even when the additional means, which I am about to describe, is employed, and these parts take said stress in the direction of their length, or in other words, longitudinally and axially of the chuck. It may be further explained that if the shank 4, were rotated contra-clockwise, the head 57 would of course be released from a low dog actuating position. However, when the drilling stress is applied clock-wise, to or on a right hand rotation, looking at Figs. 1 and 2 or 9, the action of the screw 54, with its left hand threaded engagement with shank 4, is to force the clutch portion 7, tightly against segments 14, and hence, cause the latter to clutch plate 10. Thus, in reality, the plate 10 is secured on shank 4, in the Fig. 1, position.

However, it is a feature of this invention to provide means in addition to the screw 54 and shank 4, to lock the chuck. Thus, after the dogs have been engaged with the shank 52, then, the clutch sleeve 33 is rotated in the direction of the arrow in Fig. 8, and this action advances the rollers 24, from the low points 21 of the segments 14, as shown in Fig. 8, toward and onto the high points 20, as shown in Fig. 7. As the segments 14, and plate 10, cannot turn after the dogs have gripped the drill shank, as in the Fig. 1, position, it will be clear that rotative adjustment of sleeve 33, clockwise, viewing Fig. 7, will inevitably turn the rollers 24, upwardly or rather radially outwardly onto the high points 20. The springs 25, while not actually necessary, are a valuable assistance in preventing the rollers from being moved or rolled toward the low points 21, further than is necessary in order to release the chuck, and this insures a starting position of the rollers so that only the slightest movement of sleeve 33 is necessary to clutch the shank 4.

As a result of radial movement of the segments inwardly from the Figs. 2 and 8 positions, to the Figs. 1 and 7 positions, it will be seen that portions 17 advance inwardly on clutch portions 7, thereby wedging segments 14 between part 7 and plate 10. As plate 10, cannot raise or elevate as a result of this action, because it is held by sleeve 26, it will be seen that the lower face of plate 10, acts as an abutment to the wedging or clutching action of the upper faces 15 of segments 14. Part 7, of shank 4, cannot descend because it is held up by screw 54, which latter is, in the Fig. 1, position, under compressive stress in the direction of its length, and that is why the screw 54 is termed a strut screw.

It will thus be seen that in my improved chuck, the drilling stress is taken partly longitudinally of the chuck and partly annularly thereof, and that one means is a screw means and the other is a friction clutch means.

With the chuck locked, both by the screw and friction means, the drill shank cannot be released. However, by turning the sleeve 33, in a contra-clockwise direction, view Fig. 7, the grip of the segments 14 on plate 10 and part 7, is released and then, the chuck body 36 can be turned to the left, which turning movement would elevate head 57 and thereby release the dogs from the drill shank 52. If the chuck were out of sleeve 1, then, by turning shank 4 to the left and turning the chuck body to the right, the head 57 could be more rapidly elevated.

It will also be clear that ring 30, does not form an abutment for head 8, and that the bottom 9, never engages ring 30, and the latter merely acts as a retaining member to prevent the rollers 24 and segments 14 from dropping downwardly out of position when the parts are loose.

It will now be clear that instead of having to use a wrench to loosen my improved chuck, the latter can be quickly and easily released by merely imparting a slight turning adjustment to sleeve 33.

It is believed that the device of my invention will be fully understood from the foregoing description and while I have herein shown and described one specific form of my invention, I do not wish to be limited thereto except for such limitations as the claims may import.

I claim:

1. In a chuck, a connecting member comprising a clutch head plate and a body sleeve and the latter having internal right hand threads, a clutch sleeve oscillatable on said body sleeve into clutching and releasing positions, and having lost motion connection with said body sleeve against relative endwise movement of said sleeves, a chuck shank rotatable in said head plate and having a clutch head within said body sleeve and provided with a left hand threaded bore, clutch segments for coaction with said head plate and clutch head and having cam surfaces, rollers interposed between said cam surfaces and said clutch sleeve, a chuck body having right hand threaded and shouldered connection with said body sleeve and having a drill shank bore extending through said chuck body, said chuck body having obliquely disposed jaw bores disposed in intersecting relation with said drill shank bore, jaws longitudinally slidable in said jaw bores for gripping or releasing a drill shank and said jaws having actuating fingers at their upper ends, and a jaw operating strut screw in left hand threaded engagement with said bore of said chuck shank and said strut screw having a head provided with openings for slidably receiving said fingers to actuate said jaws upon relative adjustment of said chuck body and said chuck shank.

2. In a chuck, a connecting member comprising a clutch head plate and a body sleeve, a clutch sleeve having lost motion connection with said body sleeve and movable with respect to the latter into clutching or releasing positions, a clutch shank rotatable in said head plate and having a clutch head disposed in said body sleeve and provided with a left hand threaded bore, clutch segments for coaction with said head plate and clutch head, said segments having cam surfaces, rollers interposed between said cam surfaces and said clutch sleeve, a chuck body secured to said body sleeve and having a drill shank bore, said chuck body having obliquely disposed jaw bores intersecting said drill shank bore, jaws slidable in said jaw bores into gripping and releasing positions, and a jaw operating strut screw slidably connected with said jaws and having threaded engagement with said left hand threaded bore in said chuck shank.

3. In a chuck, a chuck structure having jaws for gripping a tool shank, a clutch shank rotatably connected with said structure, a clutch device adapted to be adjusted into an active position to clutch said structure with said clutch shank, and screw means for actuating said jaws to clutch a tool shank and imparting drilling thrust to said structure and effecting clutch engagement of said clutch shank with said structure through said clutch device, and means for moving said clutch device into a releasing position to permit said screw means to actuate said jaws to release the tool shank.

4. In a quick releasing chuck, a chuck structure having tool gripping jaws, a chuck shank rotatively connected with said structure and having a clutch head, clutch segments carried by said structure, a clutch sleeve adjustable on said structure to move said segments into a position to effect clutch engagement with said head or to release said segments, and a strut screw threaded in said clutch shank and non-rotatively and operatively connected with said jaws and adapted on relative turning movement of said structure and clutch shank to actuate said jaws and transfer the resultant end thrust to said shank to engage said clutch head with said segments, said strut screw having means for structurally engaging a tool shank to effect positive non-rotative connection therewith.

In witness whereof, I have hereunto set my hand.

ERIC G. JOHNSON.